United States Patent
Chang

(10) Patent No.: US 7,150,402 B2
(45) Date of Patent: Dec. 19, 2006

(54) DEVICE AND METHOD FOR A WIRELESS MOUSE TO DETECT THE BATTERY STATUS OF A HOST COMPUTER

(76) Inventor: Yuan-Jung Chang, 4F, No. 228, Min An Rd., Hsinchuang City, Taipei Hsien (TW)

( * ) Notice: Subject to any disclaimer, the term of this patent is extended or adjusted under 35 U.S.C. 154(b) by 264 days.

(21) Appl. No.: 10/991,388

(22) Filed: Nov. 19, 2004

(65) Prior Publication Data
US 2006/0112196 A1    May 25, 2006

(51) Int. Cl.
*G06K 7/10*    (2006.01)
(52) U.S. Cl. .................. 235/472.02; 345/163
(58) Field of Classification Search .......... 235/472.02, 235/472.01; 345/163; 340/636.1; 713/300, 713/375
See application file for complete search history.

(56) References Cited

U.S. PATENT DOCUMENTS

| | | | |
|---|---|---|---|
| 5,606,242 A * | 2/1997 | Hull et al. | 320/106 |
| 6,459,896 B1 * | 10/2002 | Liebenow | 455/425 |
| 6,697,617 B1 | 2/2004 | Liebenow | |
| 6,879,259 B1 * | 4/2005 | Smith et al. | 340/636.1 |
| 2004/0025065 A1 * | 2/2004 | Lou | 713/300 |
| 2005/0199711 A1 * | 9/2005 | Vidal | 235/380 |
| 2006/0035590 A1 * | 2/2006 | Morris et al. | 455/41.2 |

\* cited by examiner

*Primary Examiner*—Ahshik Kim
(74) *Attorney, Agent, or Firm*—Rosenberg, Klein & Lee

(57) ABSTRACT

A device and method for a wireless mouse to detect the battery status of a host computer are proposed. A low-battery monitor mode of a battery is activated. Whether the battery has a low-battery status is determined. A notification message of the low-battery status is intercepted. The notification message is sent to a receiving unit of the wireless mouse by means of wireless transmission. The device has a battery module for providing power for the host computer, a battery capacity detection module electrically connected to the battery module for detecting its capacity, a transfer unit electrically connected to the battery capacity detection module for transferring the present battery status of the host computer, a receiving unit for receiving signals from the transfer unit, and a wireless mouse display unit electrically connected to the receiving unit for displaying the present battery capacity status of the host computer.

12 Claims, 3 Drawing Sheets

DEVICE AND METHOD FOR A WIRELESS MOUSE TO DETECT THE BATTERY STATUS OF A HOST COMPUTER

BACKGROUND OF THE INVENTION

1. Field of the Invention

The present invention relates to a device and method for a wireless mouse to detect the battery status of a host computer and, more particularly, to a device and method making use of a wireless mouse to detect the present battery status of a host computer.

2. Description of Related Art

Computers have become inevitable electronic products in human life. With today's era of knowledge explosion, almost all knowledge can be easily obtained from the Internet by using a computer. Among all kinds of computers, notebook computers are the most popular due to their high portability. Notebooks computers, however, have a big problem, namely, a short battery run time. Sometimes, the whole system needs to be shut down compulsorily during use due to exhaustion of the battery. In order to warn a user of the compulsory shut-down of the system in advance, a battery monitor program is installed in a notebook computer. When the notebook computer has a low-battery status, a warning message will be displayed on the screen to inform the user.

In the disclosure of U.S. Pat. No. 6,697,617, titled "Notification of a Low-battery and Maintaining Communication in a Wireless Network", a system for notifying a remote device of a low-battery capacity condition in a wireless communications system is disclosed. As shown in FIG. 1A, the system for notifying a remote device of a low-battery capacity condition in a wireless communications system comprises a wireless device 100, a workstation unit 104, a network unit 106, a near-end device 110, and a far-end device. The workstation unit 104 is connected to the wireless device through a wireless communications protocol 102. The network unit 106 is electrically connected to the workstation unit 104. The near-end device 110 is electrically connected between the workstation unit 104 and the network unit 106. The far-end device 108 is electrically connected to the network unit 106.

The disclosure of U.S. Pat. No. 6,697,617, titled "Method for Notifying a Remote Device of a Low-battery Capacity Condition in a Wireless Communications System" is illustrated in FIG. 1B. First, communication of a far-end device is initialized (Step S100). A low-battery monitor mode of a battery is then activated (Step S102). Next, whether the battery has a low-battery status is determined (Step S104). If the answer is yes, a low-battery status signal is then transferred (Step S106); otherwise, the process returns to Step S102. After the low-battery status signal is received, the whole system enters a wait mode (Step S108). The low-battery status is adjusted (Step S110). Next, whether the low-battery status has restored to a correct level is determined (Step S112). If the answer is yes, the process returns to Step S100 for initializing communication of the far-end device again; otherwise, the process returns to Step S110.

In the disclosure of R.O.C. Pat. No. 553,482, a device for pre-detection/processing before exhaustion of a battery is proposed. The device detects and sends out in advance a battery exhaustion message before exhaustion of a battery, and only consumes very little power of the battery without affecting the depletion speed of the battery.

As shown in FIG. 2A, a device 2 for pre-detection/processing before exhaustion of a battery comprises a backup power provision module 20, a power source transform module 22, a battery power provision module 24, a voltage dividing module 28, a battery capacity detection module 28, and a signal processing module 30. The backup power provision module 20 is used for receiving a public electric power as a backup power source. The power source transform module is used to drop the public electric power to a computer mother board 4, and is electrically connected to the backup power provision module 20 and the computer motherboard 4. The battery power provision module 24 is the primary power source of the pre-detection/processing device before exhaustion of battery 2. The voltage dividing module 26 is electrically connected to the battery power provision module 24. The battery capacity detection module 28 is electrically connected to the battery power provision module 24. The signal processing module 30 is electrically connected to the power source transform module 22, the battery capacity detection module 28, and a boot processing unit 40 of the computer motherboard 4. The voltage dividing module 26, the battery capacity detection module 28, and the signal processing module 30 are used to monitor the battery power usage status.

R.O.C. Pat. No. 553,482 also discloses a method for pre-detection/processing before exhaustion of a battery, as shown in FIG. 2B. First, whether a public electric AC power is available is determined (Step S200). If the answer is yes, a wake-up signal is output (Step S202); otherwise, the process returns to Step S200 for determining whether a public electric AC power is available every period of time. Next, a computer is woken up from a sleep mode to perform boot actions (Step S204). A boot program for displaying a battery exhaustion message is then executed (Step S206). Finally, the battery exhaustion message is output to a boot screen (Step S208).

As stated above, although warning messages can be displayed on the screen, the requirement for more user-friendliness can't be met successfully.

Accordingly, the present invention aims to propose a device and method for a wireless mouse to detect the battery status of a host computer to solve the above problems in the prior art.

SUMMARY OF THE INVENTION

An object of the present invention is to not only display a warning message on a screen of a notebook computer, but also to let the present battery status of a host computer be known by using a wireless mouse.

To achieve the above object, the present invention provides a method for a wireless mouse to detect the battery status of a host computer. The method comprises the steps of: activating a low-battery monitor mode of a battery; determining whether the battery has a low-battery status; intercepting a notification message of the low-battery status; and sending the notification message of the low-battery status to a wireless mouse display unit by means of wireless transmission.

The present invention also provides a device for a wireless mouse to detect the battery status of a host computer. The device comprises a battery module for providing the required power for the host computer, a battery capacity detection module electrically connected to the battery module for detecting the capacity of the battery module, a host computer display unit electrically connected to the battery capacity detection module and used to display the present battery capacity status of the host computer, a transfer unit electrically connected to the battery capacity detection module for transferring the present battery status of the host computer to the wireless mouse, a receiving unit used to receive signals from the transfer unit by means of the wireless transmission, and a wireless mouse display unit electrically connected to the receiving unit for displaying the present battery capacity status of the host computer.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

In the prior art, when a notebook computer has a low-battery status, an LED installed at an end of the notebook computer will flash. If a user utilizes a wireless mouse for briefing, because there is a distance from the notebook, in addition to displaying a low-battery warning message on the screen, a signal will also be sent to the wireless mouse to let at least an LED thereon flash to notify the user of the low-battery condition of the notebook computer.

An object of the present invention is to not only display a warning message on a screen of a notebook computer, but also to let the present battery status of a host computer be known by using a wireless mouse.

Figure 1A:
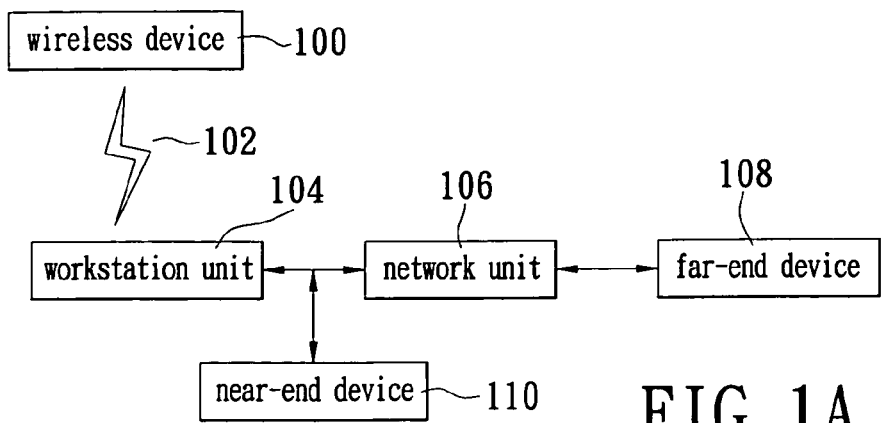
FIG. 1A is a block diagram of a system for notifying a remote device of a low-battery capacity condition in a wireless communications system in the prior art.
Figure 1B:
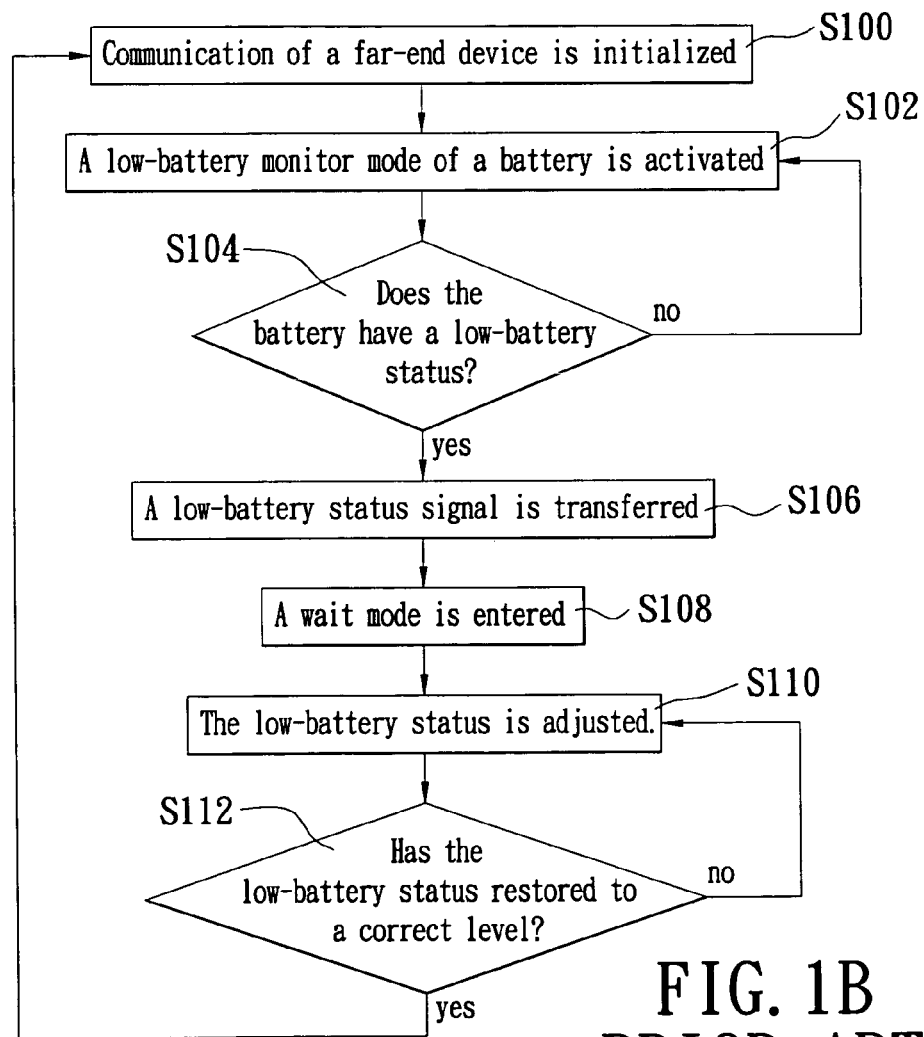
FIG. 1B is a flowchart of a method for notifying a remote device of a low-battery capacity condition in a wireless communications system in the prior art.
Figure 2A:
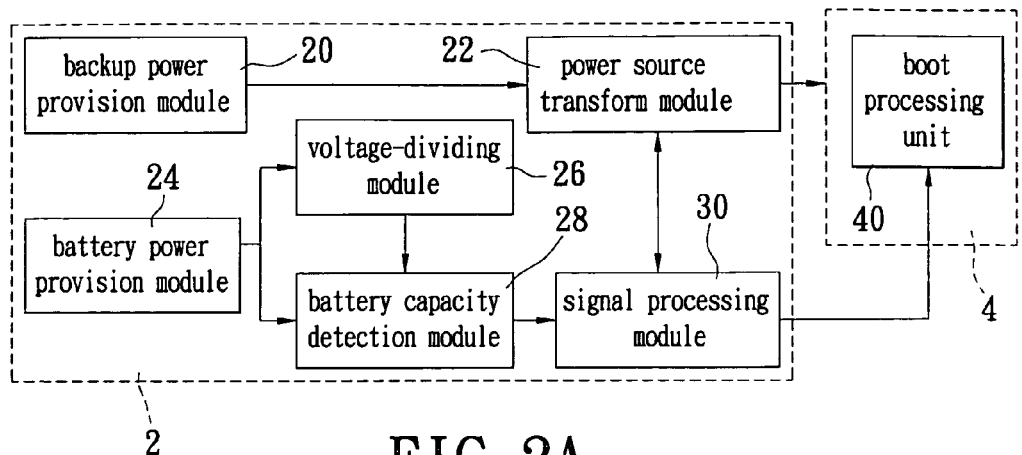
FIG. 2A is a block diagram of a device for pre-detection/processing before exhaustion of a battery in the prior art.
Figure 2B:
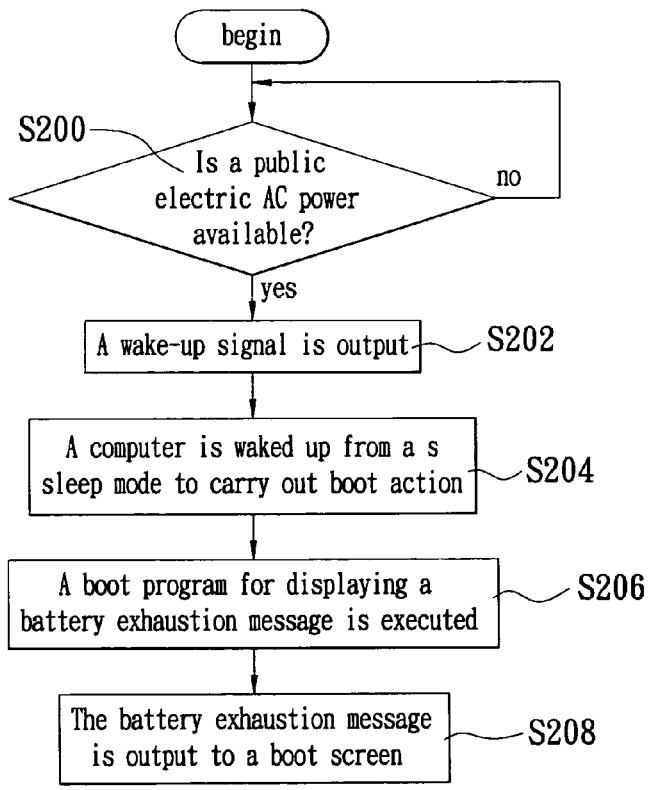
FIG. 2B is a flowchart of a method for pre-detection/processing before exhaustion of a battery in the prior art.
Figure 3A:
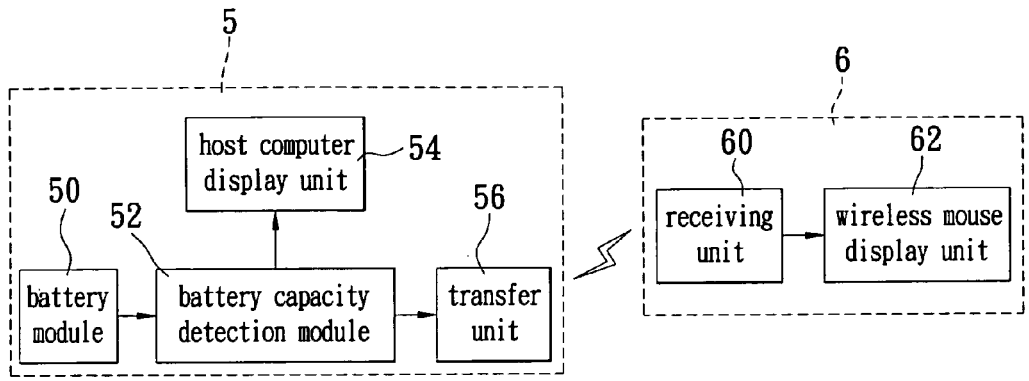
FIG. 3A is a block diagram of a device for a wireless mouse to detect the battery status of a host computer of the present invention.

As shown in FIG. 3A, a device for a wireless mouse to detect the battery status of a host computer comprises a notebook computer 5. The notebook computer 5 further comprises a battery module 50 for providing the required power for the notebook computer 5, a battery capacity detection module 52 electrically connected to the battery module 50 for detecting the capacity of the battery module 50, a host computer display unit 54 electrically connected to the battery capacity detection module 52 and used to display the present battery capacity status of the host computer, a transfer unit 56 electrically connected to the battery capacity detection module 52 for transferring the present battery status of the host computer to a wireless mouse 6, a receiving unit 60 used to receive signals from the transfer unit 56 by means of the wireless transmission, and a wireless mouse display unit 62 electrically connected to the receiving unit 60 for displaying the present battery capacity status of the host computer. The host computer display unit 54 is a screen. The wireless mouse display unit 62 comprises at least an LED.

Figure 3B:
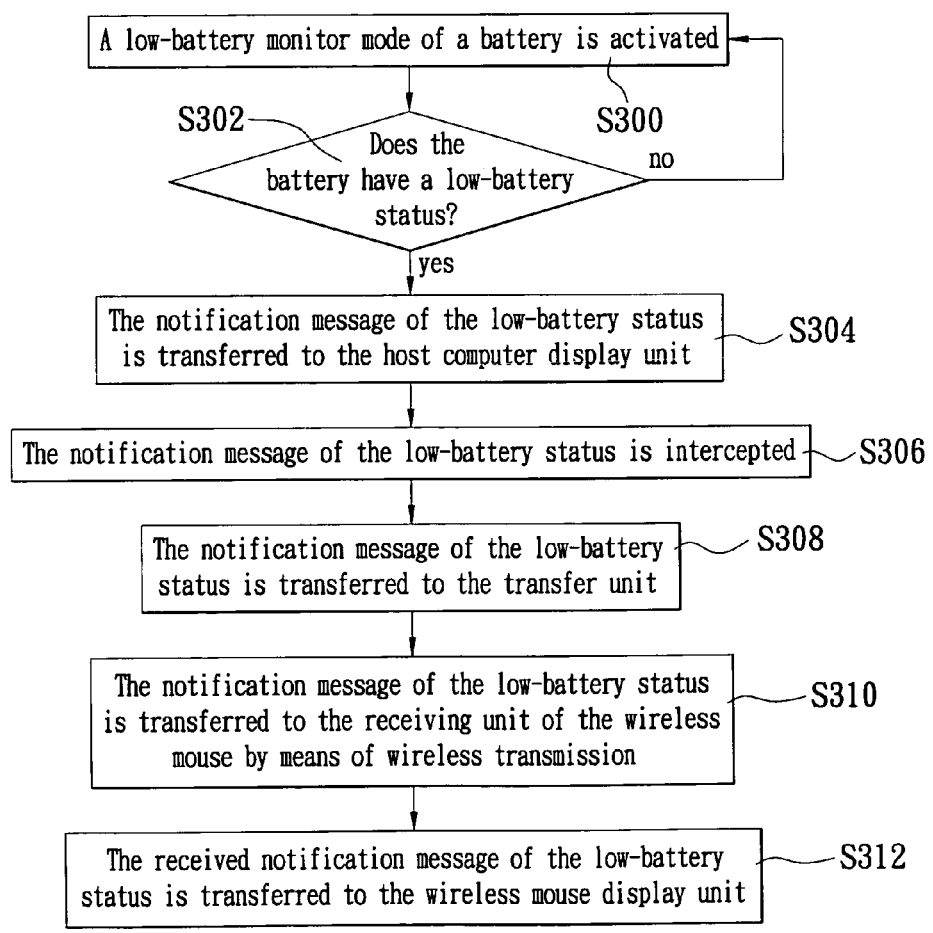
FIG. 3B is a flowchart of a method for a wireless mouse to detect the battery status of a host computer of the present invention.

As shown in FIG. 3B, a method for a wireless mouse to detect the battery status of a host computer of the present invention comprises the following steps. First, a low-battery monitor mode of a battery is activated (Step S300). Whether the battery has a low-battery status is then determined (Step S302). If the answer is yes, the notification message of the low-battery status is transferred to a host computer display unit (Step S304); otherwise, Step S300 is jumped back to. The display type can be a graphics or a voice alarm.

Subsequently, a notification message of the low-battery status is intercepted. (Step S306). The notification message of the low-battery status is intercepted by using a firmware or a driver. Next, the notification message of the low-battery status is transferred to a transfer unit in the host computer (Step S308). The notification message of the low-battery status is transferred to a receiving unit of the wireless mouse by means of wireless transmission (Step S310). The wireless transmission can be accomplished by means of RF signal transmission or bluetooth signal transmission. Finally, the received notification message of the low-battery status is transferred to a wireless mouse display unit (Step S312).

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A method for a wireless mouse to detect a battery status of a host computer, the method comprising the steps of:
    activating a low-battery monitor mode of a battery;
    determining whether said battery has a low-battery status;
    intercepting a notification message of said low-battery status; and
    sending said notification message of said low-battery status to a receiving unit of said wireless mouse by means of wireless transmission.

2. The method for a wireless mouse to detect the battery status of a host computer as claimed in claim 1, wherein in said step of determining whether said battery has a low-battery status, if an answer is yes, a step of sending said notification message of said low-battery status to a host computer display unit is performed, and otherwise, the method returns to said step of activating a low-battery monitor mode of a battery.

3. The method for a wireless mouse to detect the battery status of a host computer as claimed in claim 2, wherein the display type can be a graphics or a voice alarm in said step of sending said notification message of said low-battery status to a host computer display unit.

4. The method for a wireless mouse to detect the battery status of a host computer as claimed in claim 1, wherein a firmware or a driver is used to intercept said notification message in said step of intercepting a notification message of said low-battery status.

5. The method for a wireless mouse to detect the battery status of a host computer as claimed in claim 1, further comprising a step of sending said notification message of the low-battery status to a transfer unit in said host computer after said step of intercepting a notification message of said low-battery status.

6. The method for a wireless mouse to detect the battery status of a host computer as claimed in claim 1, wherein the wireless transmission is accomplished by means of RF signal transmission.

7. The method for a wireless mouse to detect the battery status of a host computer as claimed in claim 1, wherein the wireless transmission is accomplished by means of bluetooth signal transmission.

8. The method for a wireless mouse to detect the battery status of a host computer as claimed in claim 1, further comprising a step of sending said received notification message of said low-battery status to a wireless mouse display unit after said step of sending said notification message of the low-battery status to a receiving unit of said wireless mouse by means of wireless transmission.

9. A device for a wireless mouse to detect the battery status of a host computer capable of transferring a present battery status of said host computer to a wireless mouse display unit by means of wireless transmission, said device comprising:
 a battery module for providing the required power for said host computer;
 a battery capacity detection module electrically connected to said battery module for detecting the capacity of said battery module;
 a transfer unit electrically connected to said battery capacity detection module for transferring the present battery status of said host computer to said wireless mouse;
 a receiving unit for receiving signals from said transfer unit by means of said wireless transmission; and
 a wireless mouse display unit electrically connected to said receiving unit for displaying the present battery capacity status of said host computer.

10. The device for a wireless mouse to detect the battery status of a host computer as claimed in claim 9, further comprising a host computer display unit electrically connected to said battery capacity detection module for displaying the present battery capacity status of said host computer.

11. The device for a wireless mouse to detect the battery status of a host computer as claimed in claim 9, wherein said host computer display unit is a screen.

12. The device for a wireless mouse to detect the battery status of a host computer as claimed in claim 9, wherein said wireless mouse display unit comprises at least an LED.

* * * * *